United States Patent [19]

Vanistendael

[11] Patent Number: 4,592,682

[45] Date of Patent: Jun. 3, 1986

[54] WEAR PADS

[75] Inventor: David M. Vanistendael, Washington, Pa.

[73] Assignee: Davan Industries, Washington, Pa.

[21] Appl. No.: 649,209

[22] Filed: Sep. 10, 1984

[51] Int. Cl.[4] .............................................. B23Q 3/06
[52] U.S. Cl. ................................ 408/241 R; 269/257; 269/282; 279/123
[58] Field of Search .................. 279/123, 155, 1 R; 269/257, 259, 262, 271, 282, 285, 273; 408/241 R; 248/188.9

[56] References Cited

U.S. PATENT DOCUMENTS

| | | | |
|---|---|---|---|
| 2,919,925 | 1/1980 | Snyder et al. | 279/123 |
| 3,090,614 | 5/1963 | Freeman et al. | 279/123 X |
| 3,179,430 | 4/1965 | Ziendan | 279/123 |
| 3,211,464 | 10/1965 | Mott et al. | 279/123 |
| 3,459,433 | 8/1969 | Hohwart | 277/123 |
| 4,431,202 | 2/1984 | Swenson | 279/123 |

Primary Examiner—Gil Weidenfeld
Assistant Examiner—Glenn L. Webb
Attorney, Agent, or Firm—Buell, Ziesenheim, Beck & Alstadt

[57] ABSTRACT

A wear pad assembly is provided for machine tools or the like in the form of a generally frusto-conical pad member having a support surface on its base to receive a work piece and a base having a frusto-conical opening supportingly receiving the apex end of the pad member and a threaded attachment member removably connecting the apex end of the pad member with said base. The support surface is preferably knurled or otherwise toothed and hardened to hold a work piece against slipping.

7 Claims, 9 Drawing Figures

WEAR PADS

This invention relates to wear pads and particularly to replaceable inserts or pads for clamping equipment, vise jaws, support pads for machine tools and the like.

Machine tool equipment, particularly clamping and supporting equipment, makes use of support or wear pads on which work in process is held or carried during machining operations. These are generally replaceable elements which can be removed and discarded, and replaced by new pads without loss of the entire clamping or wear surface.

Conventional pads now commercially available are generally cylindrical in shape and require a precision machined hole which is usually drilled and then reamed for a precise fit. Such pads also usually require the use of a holding or fastening screw from the bottom or side of the machine tool surface in order to retain them in place. Such conventional pads have numerous disadvantages. First, and perhaps most important, they require removal of too much of the base material, thereby weakening the mounting base. Secondly, they cannot be mounted close to an edge because the mounting hole will break through the side of the base. Third, such pads can and in practice frequently do, shift position if the mounting is not a very close fit.

I provide a wear or support pad structure which eliminates all of these problems. The pads of my invention can be mounted in a support base much closer to the edge than conventional pads and in many cases may even overhang the edge slightly and still provide both adequate support for the work and no likelihood of breaking away from the base. In using the pads of this invention there is much less metal removed from the base and the whole assembly is, therefore, much stronger. Mounting of the pads of this invention is much quicker and easier requiring only drilling a hole with a standard combination center drill and counter sink and then tapping the hole or counter boring from the back depending on the type of pad desired. When male threaded pads are used the support can be drilled, tapped and the pad inserted all from one side of the support.

Simply stated the pad of the present invention is very economically produced and inserted. It has a much wider range of applications then conventional pads. It is sturdier than anything commercially available. It is easier to use than any conventional pad now available. It can be used in a more confined space and in places where conventional pads cannot safely be used.

I provide a wear pad assembly comprising a generally frusto-conical pad member, a support surface on the base of said conical member, a base having a frusto-conical opening receiving a major portion of the apex end of the frusto-conical pad member, a passage coaxial with the axis of the frusto-conical pad member, and threaded attachment means removably connecting said frusto-conical pad member in said frusto-conical opening in the base. Preferably the threaded attachment means is a coaxial threaded stud on the apex end of the frusto-conical member, however, it may be a separate bolt threaded into a coaxial opening in the apex end of the frusto-conical pad member. The support surface of the pad member is preferably hardened, however, it may be provided with one or more carbide inserts or remain unhardened depending upon its intended use. Preferably, the conical portion is a 60° cone.

In the foregoing outline of this invention I have set out certain objects, purposes and advantages of the invention. Other objects, purposes and advantages of this invention will be apparent from a consideration of the following description and drawings in which.

Figure 1:
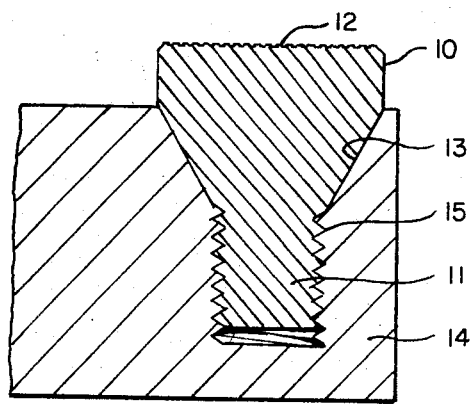
FIG. 1 is a sectional view of a wear pad of this invention in place.
Figure 2:
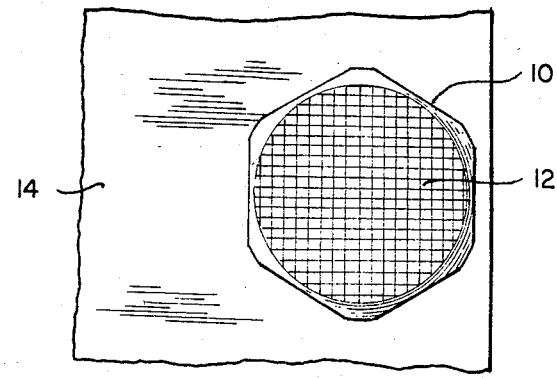
FIG. 2 is a top plan view of the wear pad assembly of FIG. 1.

Referring to the drawings and particularly to FIGS. 1 and 2, I have illustrated a wear pad 10 of generally frusto-conical shape having a threaded stud portion 11 extending from its apex end coaxial with the frusto conical body. The base of the cone 12 which acts as the support surface is serrated and hardened such as by case hardening. The conical body is inserted into a conical opening 13 in a base 14 having a threaded coaxial opening 15 receiving threaded stud 11 and threaded into place with its conical sides supported by the conical surface of the conical opening. As can be seen from FIG. 1, the wear pad support surface 12 can be close to the edge of the base 14 while being supported by a substantial amount of metal.

Figure 3:
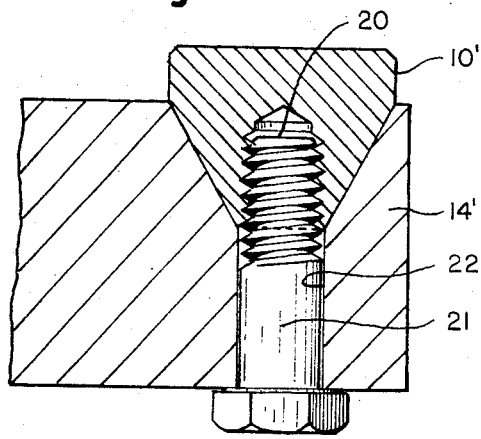
FIG. 3 is a sectional view of a second embodiment of wear pad according to this invention.

In FIG. 3 I have illustrated a second embodiment in which like parts bear like numbers. In this embodiment the frusto-conical wear pad 10' is provided with a threaded female opening 20 extending coaxially from the apex end. A fastening bolt 21 is passed through opening 22 from the bottom of base 14' into threaded opening 20 and tightened. This form of wear pad may be used where access to the bottom of base 14' can be had.

Figure 4:
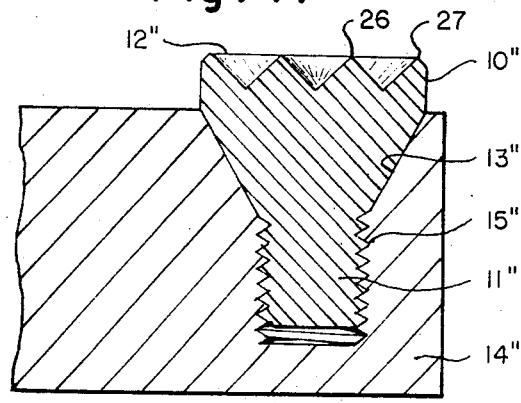
FIG. 4 is a sectional view of a third embodiment of this invention.
Figure 5:
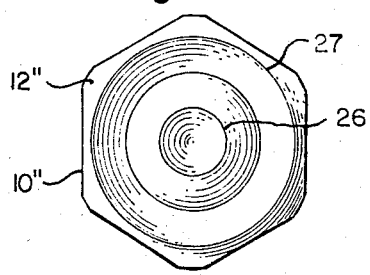
FIG. 5 is a top plan view of the embodiment of FIG. 4.

In FIGS. 4 and 5, I have illustrated another embodiment similar to FIG. 1 in which like parts are given like numbers with a double prime sign. In this embodiment the only difference from FIG. 1 is that the support surface 12" is not serrated but provided with concentric support rings 26 and 27.

Figure 7:
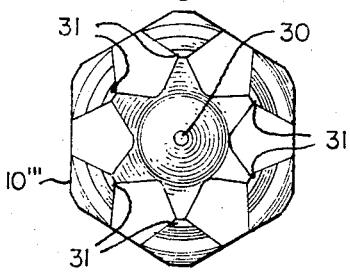
FIG. 7 is a top plan view of the wear pad of FIG. 6.
Figure 6:
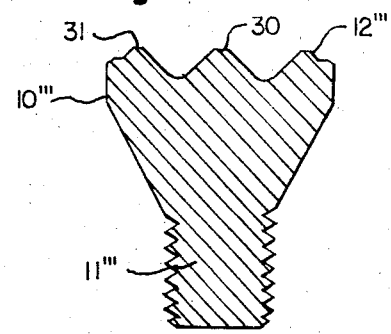
FIG. 6 is a sectional view of a fourth embodiment of the wear pad of this invention.

FIGS. 6 and 7 show another embodiment similar to FIG. 1 with like parts bearing like numbers and with a triple prime sign. Here again the only difference is in the support surface 12 which has been machined to provide a central support point 30 and spaced concentric circle points 31 which are case hardened.

Figure 9:
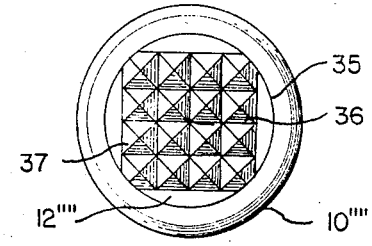
FIG. 9 is a top plan view of the wear pad of FIG. 8.
Figure 8:
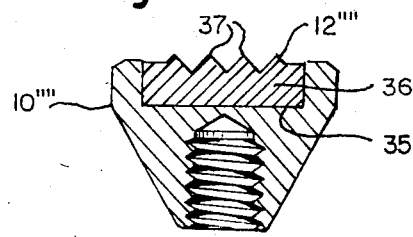
FIG. 8 is a sectional view of a fifth embodiment of wear pad according to this invention.

In FIGS. 8 and 9 I have illustrated another embodiment similar to FIG. 1 with like parts having quadruple prime signs. Here the wear pad differs from that of FIG. 1 in having a central recess 35 in support surface 12"" into which a carbide insert 36 having a serrated surface 37 is brazed or otherwise attached and in being circular in configuration.

In the foregoing specification I have set out certain preferred practices and embodiments of my invention, however, it will be understood that this invention may be otherwise embodied within the scope of the following claims.

I claim:

1. A wear pad assembly comprising a generally frusto-conical pad member, a support surface on the base of said frusto conical pad member to receive a work piece, a separate support base having a frusto-conical opening receiving in supporting and load bearing contact a major portion of the apex end of the frusto-conical pad member opposite the support surface whereby a minimum of material is removed from said support base while providing load support and attachment means removably connecting the apex end of the frusto-conical pad member with said base.

2. A wear pad assembly as claimed in claim 1 wherein the support surface is provided with spaced teeth.

3. A wear pad as claimed in claim 2 wherein the teeth are hardened.

4. A wear pad assembly as claimed in claim 1 or 2 or 3 wherein the attachment means is a threaded stud integral with the wear pad at the apex end and coaxial with the conical axis of said pad, said stud threadingly engaging a threaded opening at the apex of the conical opening of the base.

5. A wear pad assembly as claimed in claim 1 or 2 or 3 wherein the attachment means is a bolt passing through an opening in the base coaxial with the conical axis of the frusto-conical opening in the base and threadingly engage a threaded female opening in the apex of the pad member coaxial with the conical axis of the pad member.

6. A wear pad assembly as claimed in claim 4 wherein a carbide insert in the base of the pad member forms the support surface.

7. A wear pad assembly as claimed in claim 5 wherein a carbide insert in the base of the pad member forms the support surface.

* * * * *